United States Patent
Berndt et al.

(10) Patent No.: US 7,953,797 B2
(45) Date of Patent: May 31, 2011

(54) METHOD FOR ASSIGNING CLIENTS DISTRIBUTED ACROSS A PLURALITY OF NETWORKS TO A SERVER AND A CLIENT FOR IMPLEMENTING THE METHOD

(75) Inventors: Stefan Berndt, Bönen (DE); Thomas Hanna, Detmold (DE); Thorsten Laux, Paderborn (DE); Christian Scheering, Bielefeld (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1725 days.

(21) Appl. No.: 10/891,798

(22) Filed: Jul. 15, 2004

(65) Prior Publication Data

US 2005/0050192 A1    Mar. 3, 2005

(30) Foreign Application Priority Data

Aug. 25, 2003  (DE) .................................. 103 39 051

(51) Int. Cl.
*G06F 15/16* (2006.01)
(52) U.S. Cl. ........................................................ 709/205
(58) Field of Classification Search .................. 709/205, 709/220–223, 204
See application file for complete search history.

(56) References Cited

U.S. PATENT DOCUMENTS

| | | | | |
|---|---|---|---|---|
| 6,535,509 B2 * | 3/2003 | Amicangioli | | 370/389 |
| 2002/0184310 A1 * | 12/2002 | Traversat et al. | | 709/204 |
| 2003/0055961 A1 * | 3/2003 | Torii | | 709/224 |
| 2003/0061315 A1 | 3/2003 | Jin | | |
| 2003/0097425 A1 * | 5/2003 | Chen | | 709/220 |
| 2003/0163583 A1 * | 8/2003 | Tarr | | 709/245 |
| 2003/0187931 A1 * | 10/2003 | Olsen et al. | | 709/205 |
| 2004/0054820 A1 * | 3/2004 | Karaoguz et al. | | 710/8 |
| 2007/0136305 A1 * | 6/2007 | Kelley et al. | | 707/10 |

FOREIGN PATENT DOCUMENTS

EP    1339190 A2    8/2003

OTHER PUBLICATIONS

Indranil Gupta, Robbert Van Renesse and Kenneth P. Birman, "A Probabilistically Correct Leader Election Protocol for Large Groups", Apr. 2000, downloaded Aug. 7, 2003 from http://www.cs.cornell.edu/home/rvr/papers/ProbLeaderElection.pdf, pp. 1-12.
R. Droms, "Dynamic Host Configuration Protocol", Network Working Group, Request for Comments: 2131, Standards Track, Mar. 1997, pp. 1-45.
Service Location Protocol: Automatic Discovery of IP Network Services by Erik Guttman; Jul.-Aug. 1999; http.//computer.org/internet/.
European Search Report dated Dec. 13, 2004.

* cited by examiner

*Primary Examiner* — Ario Etienne
*Assistant Examiner* — Hee Soo Kim

(57) ABSTRACT

To assign clients distributed across a plurality of subnetworks to a server, one of the clients is first selected in a respective subnetwork. A search is carried out across the subnetworks by a respective selected client for other selected clients and for the server, whereby when it locates the server, the selected client stores server address information identifying said server and when it locates another selected client, it requests the server address information from that client and stores it on receipt. The stored server address information is transmitted by the selected client to one or a plurality of other selected or non-selected clients.

12 Claims, 3 Drawing Sheets

METHOD FOR ASSIGNING CLIENTS DISTRIBUTED ACROSS A PLURALITY OF NETWORKS TO A SERVER AND A CLIENT FOR IMPLEMENTING THE METHOD

CROSS REFERENCE TO RELATED APPLICATIONS

This application claims priority to the German application No. 10339051.0, filed Aug. 25, 2003 and which is incorporated by reference herein in its entirety.

FIELD OF INVENTION

The invention relates to a method for assigning clients distributed across a plurality of networks to a server and a client for implementing the method.

BACKGROUND OF INVENTION

Modern communication or data processing systems are frequently distributed across a plurality of subnetworks, e.g. what are known as local area networks (LAN), which in turn are networked via long-range or wide area networks (WAN) to larger networks. An important principle of the architecture of such distributed communication or data processing systems is what is known as the client-server principle. Server here refers to a device which provides central services in a distributed system for a plurality of service users distributed over the network, known as clients. The clients and server generally operate autonomously, i.e. a server provides its services independently of the respective client. A client can only make use of such services as are provided by an available server, whereby after using a service the client has no further influence on the processing performed by the server.

For clients to use the services provided by a server it is necessary for the server to know and be able to address the clients and the clients the server. In other words, the relevant clients have to be assigned to the server as a basis for any interaction between client and server.

In many instances, in particular in internet protocol based networks, a server is assigned to clients by manual configuration of the relevant clients or the server. Generally this entails the internet protocol addresses of the individual clients being configured in the server or the internet protocol address of the server being configured in the clients. The clients and server are thus assigned to each other at the outset. However, a manual configuration of this kind requires a considerable amount of time and effort, particularly in large networks with a large number of potential clients. Moreover, whenever there is a need to change the assignment, e.g. due to switchover to a new server or the adding of new clients, a further manual configuration is required.

Because of the large amount of time and effort required for manual configuration, automated assignment methods known as autodiscovery methods are increasingly used. One frequently used method is based on what are known as DHCP servers (DHCP: Dynamic Host Configuration Protocol) being configured so that they can supply client or server addresses on request. Such a method does, however, require suitably configured DHCP servers to be available in every subnetwork and to be coordinated across subnetworks. In this arrangement, any change in the client-server assignment requires configuration data to be updated accordingly in the DHCP servers. DHCP servers are known for example from the internet document "Request for Comments: 2131, Dynamic Host Configuration Protocol" by R. Droms, dated March 1997.

SUMMARY OF INVENTION

The object of the present invention is to specify a method for assigning clients distributed across a plurality of subnetworks to a server, the configuration of which requires less time and effort. The object of the invention is also to specify a client for implementing the method.

This object is achieved by the claims.

With the inventive method, in order to assign clients distributed across a plurality of subnetworks, e.g. local area networks, to a server, one of the clients is selected in a respective subnetwork. According to the invention such a respective selected client searches across the subnetworks for other selected clients and for the server, whereby the selected client, upon locating the server, stores server address information identifying said server and, upon locating another selected client, requests the server address information from that client and stores it on receipt. The stored server address information is transmitted by the selected client to one or a plurality of other selected or non-selected clients.

The inventive method can be used to enable a plurality of clients of different subnetworks to carry out the search for the server in parallel. The parallel search means that the server can generally be located very quickly by one of the selected clients. The server to be searched for does not have to be modified in order to implement the method. A respective selected client can identify the server, for example by interrogating a server port assigned to a service to be used. Once the server is located by one of the selected clients, the server address information can be distributed, starting from said selected client, via other selected or non-selected clients by cascading, and therefore very quickly, across subnetworks to the clients, which are assigned in this way to the located server.

The invention allows decentralized and essentially self-organizing client-server assignment. In particular there is no requirement for central information services such as DHCP or for manual configuration or reconfiguration of the clients, the server or other network components.

A further advantage of the invention is that execution of the active search for the server can be restricted to selected clients, which means significantly less of a load on the network than if all the clients searched for the server.

The inventive method is also characterized by short latency or reconfiguration times when clients or a new server are newly connected, since for newly connected clients to obtain the server address information it is sufficient to locate a selected client that has already obtained the server address information, rather than the server itself. If the selected client in the same subnetwork has already obtained the server address information, a client newly connected to said subnetwork can be provided with the server address information particularly easily.

Avantageous embodiments and developments of the invention are set out in the dependent claims.

Transmission of the stored server address information to the at least one selected or non-selected other client can be initiated in particular by a query originating from said client. The server address information is preferably transmitted by the selected client to all clients to be assigned to the server in its own subnetwork and/or to all selected clients known to it outside its subnetwork, in each case either on its own initiative or as a result of a query. Transmission of the server address information to as many other clients as possible allows very fast, cross-subnetwork, cascaded distribution of the server address information.

When it locates another selected client, the selected client can preferably store client address information identifying said client. Such client address information can be forwarded to other clients, which might in some instances have made such a request. The cross-subnetwork distribution of client address information to selected clients means that said clients can create a topological map of their network environment and use it for cross-subnetwork communication. Further to receipt of the server address information, the selected client can also transmit this to one or a plurality of selected clients identified by one or a plurality of items of stored client address information.

According to one advantageous embodiment of the inventive method, client selection in a subnetwork can be effected by its clients. The clients of a subnetwork can select a client from among themselves or among the clients of other subnetworks preferably in an autonomous manner. Therefore no external configuration is required to select a client.

According to a further advantageous embodiment of the invention, a selected first client, upon locating a non-selected client that is located in another subnetwork, can prompt said client to transmit a query for the server address information to the second client selected in its subnetwork. For this purpose the non-selected client can inform the second client accordingly so that the latter handles the response to the query in respect of the first client and transmits the server address information, if known, to the first client. Alternatively, the non-selected client can itself interrogate the second client and forward any server address information obtained to the first client. According to a further alternative, the non-selected client can transmit client address information identifying the second client to the first client so that the latter can interrogate the second client directly.

BRIEF DESCRIPTION OF THE DRAWINGS

One exemplary embodiment of the invention is described in more detail below with reference to the drawing, in which.

DETAILED DESCRIPTION OF INVENTION

FIGS. 2-5 each show a schematic representation of a network comprising a plurality of subnetworks SNA, SNB, SNC and SND. For the present exemplary embodiment it is assumed that the subnetworks SNA, ..., SND are provided by internet protocol based local networks, known as LANs (LAN: Local Area Network), which are linked together via a long-range network (not shown) such as the internet. The subnetwork SND hereby comprises a server SRV, which provides a service, e.g. a communication, data processing and/or information service via a predefined or dynamically assigned server port in the network. Furthermore, the subnetwork SNA comprises clients C1, C2, C3 and CSA, the subnetwork SNB clients CL and CSB, and the subnetwork SNC clients CL and CSC, respectively. The clients CSA, CSB, CSC, C1, C2, C3 and CL require the service provided by the server SRV and must be assigned to it for this purpose. To assign the clients CSA, ..., CL to the server SRV it is necessary for the clients CSA, ..., CL to know an item of address information SA identifying the server SRV, in the present exemplary embodiment an internet protocol address of the server SRV. The internet protocol address SA of the server SRV, hereafter generally referred to as the IP address, is transmitted to the clients CSA, ..., CL by means of the inventive method.

Figure 1:
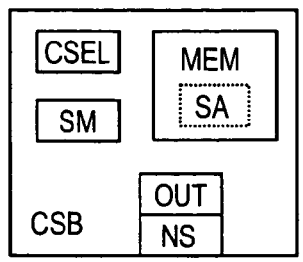
FIG. 1 shows a client according to the invention.

FIG. 1 shows a schematic representation of an inventive structure of the client CSB. The client CSB has a network interface NS for connecting to the subnetwork SNB. The client CSB also comprises a selection module CSEL for selecting a client from all or a predefined group of clients CL and CSB connected to the same subnetwork, in this instance SNB, as the client CSB. Selection takes place by means of interaction of the selection modules CSEL of all clients CSB and CL involved in the selection using known selection methods. Such a selection method is for example known from the freely available document posted on the internet on Aug. 7, 2003 at the address "http://www.cs.cornell.edu/home/rvr/papers/ProbLeaderElection.pdf" entitled "A Probabilistically Correct Leader Election Protocol for Large Groups", by Gupta, van Renesse and Birman, dated April 2000.

Figure 2:
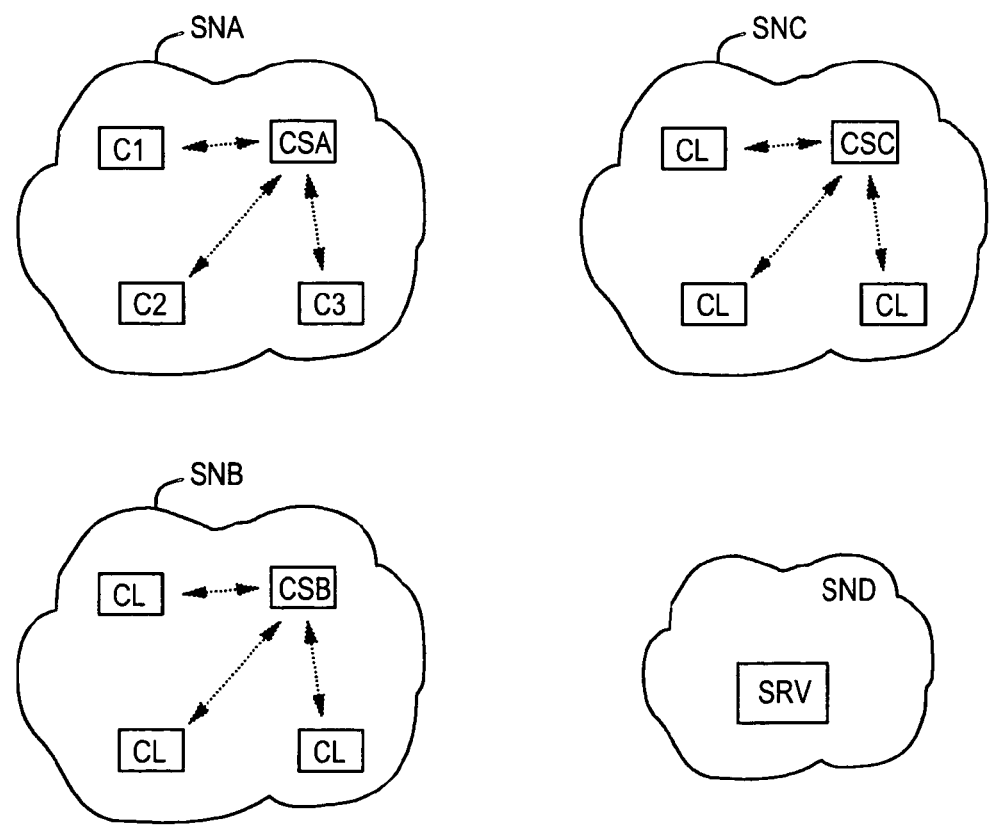
FIGS. 2-5 show a network comprising a plurality of subnetworks in different stages of the method.

It is assumed for the present exemplary embodiment that the client CSB is selected by the selection executed jointly by the clients CSB and CL in the subnetwork SNB. It is similarly assumed that in the subnetwork SNA the client CSA is selected by the clients C1, C2, C3 and CSA, and in the subnetwork SNC the client CSC is selected by the clients CL and CSC. Precisely one client CSA, CSB or CSC is therefore selected in each of the subnetworks SNA, SNB and SNC. The clients CSA, CSB and CSC are therefore referred to below as selected clients and the clients C1, C2, C3 and CL as non-selected clients. A respective selected client CSA, CSB or CSC is assigned to the non-selected clients of its subnetwork SNA, SNB or SNC after its selection—as shown in FIG. 2 by dotted double arrows. After its selection, a respective selected client CSA, CSB or CSC can transmit information, preferably by means of what is known as a broadcast message, to other components, e.g. non-selected clients of its subnetwork SNA, SNB or SNC.

The client CSB shown in FIG. 1 also has a search module SM for cross-subnetwork searching for the server SRV and selected clients, in this case CSA and CSC, in other subnetworks, in this instance SNA and SNC. The client CSB also comprises a memory MEM for storing the IP address SA of the server SRV if the server SRV is located or the IP address SA of a located selected client is transmitted. The client CSB also comprises an output module OUT in order to transmit any stored server IP address SA to selected clients CSA, CSC of other subnetworks SNA, SNC and to the non-selected clients CL of its own subnetwork SNB. The clients CSA and CSC essentially have the same structure as the client CSB shown in FIG. 1.

Figure 3:
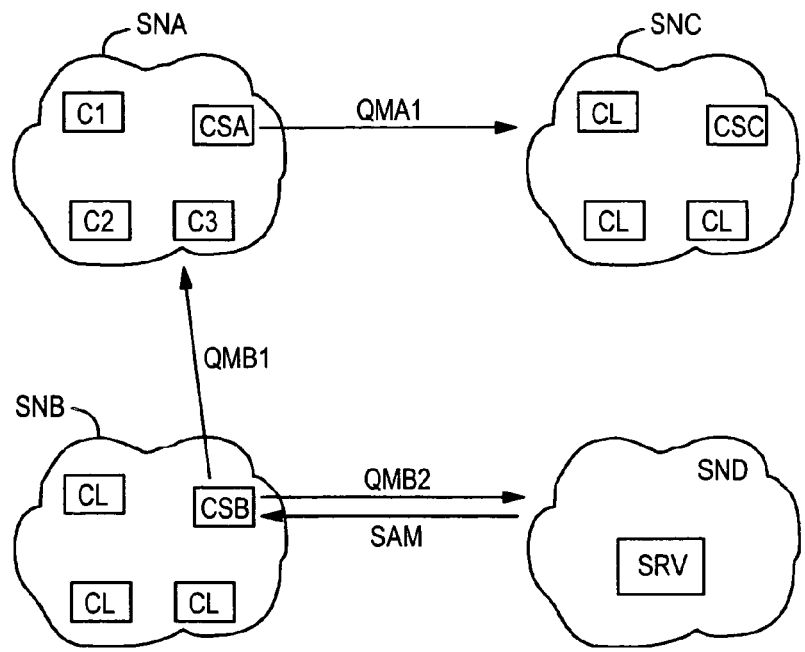
Figure 4:
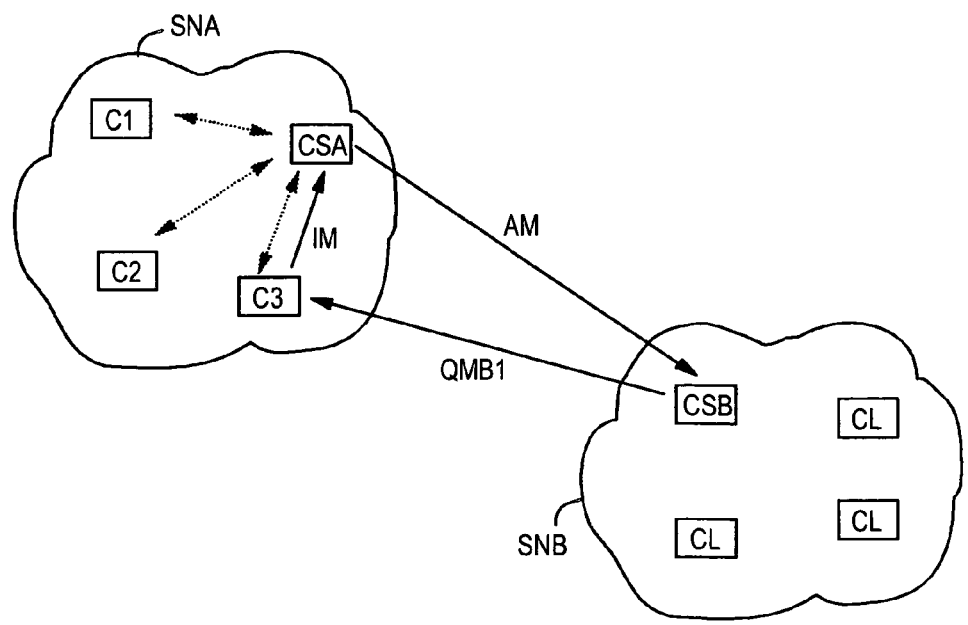

FIG. 3 shows the cross-subnetwork search executed by the selected clients CSA, CSB and CSC after their respective selection. In the present exemplary embodiment the search module SM of the client CSB initiates transmission of a first query message QMB1 to the subnetwork SNA and a second query message QMB2 to the subnetwork SND as part of its search. Independently of this, the selected client CSA transmits a query message QMA1 to the subnetwork SNC. The query messages QMA1, QMB1 and QMB2 can preferably be sent to the port number of the above-mentioned server port via which the server SRV provides its service. Parallel to this, the selected clients CSA, CSB and CSC themselves monitor this port number in order to service similar queries by other clients in an appropriate manner.

A selected client, e.g. CSB can encounter different types of client during its search outside its own network. The example of the client CSB searching by means of transmission of query messages QMB1 and QMB2 is used below to describe the further method stages based on the type of located client, i.e. client receiving a respective query message QMB1 or QMB2:

If a client that does not support the inventive method is located (not shown in the drawing), the searching client CSB identifies this by the absence of an expected response and continues its search.

If a non-selected client that supports the inventive method, e.g. C3, is located, said client does not respond to the searching client CSB in the present exemplary embodiment, but instead informs the selected client CSA in its own network SNA of the query. The informed client CSA then deals with the response. This case is shown further in FIG. 4. According to FIG. 4, the selected client CSB transmits the query message QMB1 sent to the above-mentioned port number to the non-selected client C3 of the subnetwork SNA. The client C3 then transmits an information message IM to the selected client CSA of its subnetwork SNA, by means of which the client CSA is informed of the query by the client CSB. The client CSA then responds to the query by transmitting a response message AM to the client CSB. If the client CSA already knows the server IP address SA as a result of its own queries, it transmits the server IP address SA with the response message AM to the client CSB. If however the client CSA does not know the server IP address, the client CSB is notified of this by a correspondingly negative response message AM. In the event of a negative response message the searching client CSB continues its search.

If another selected client, e.g. CSA or CSC, is located, said client responds directly to the query from the client CSB. If the located selected client CSA or CSC already knows the server IP address SA as a result of its own queries, this is transmitted to the interrogating client CSB. If the located client CSA or CSC does not yet know the server IP address SA, a negative response message is correspondingly transmitted. In the event of a negative response message the searching client CSB continues its search.

Further information is preferably exchanged between the searching and the located selected clients, in order for example to create a topological map of a network environment of the selected clients. The searching client CSB advantageously stores the IP addresses of all located selected and/or non-selected clients in its memory MEM.

If the selected client CSB locates the server SRV itself, it identifies this from the response of the server SRV to its port interrogation and then stores the IP address SA of the located server SRV in the memory MEM.

FIG. 3 shows how the server SRV is located. In FIG. 3 the query message QMB2 is transmitted to the server SRV in the subnetwork SND, whereupon the server SRV transmits a response message SAM back, from which the requesting client CSB identifies the server SRV. After identifying the server SRV, the client CSB stores the IP address of the located server SRV as the server IP address SA in its memory MEM.

As soon as a selected client, in this instance CSB, knows the server IP address SA, it can transmit this to other clients, which in turn distribute the transmitted server IP address SA to further clients. In this way the server IP address SA is distributed by cascading across the subnetworks SNA, SNB and SNC.

Figure 5:
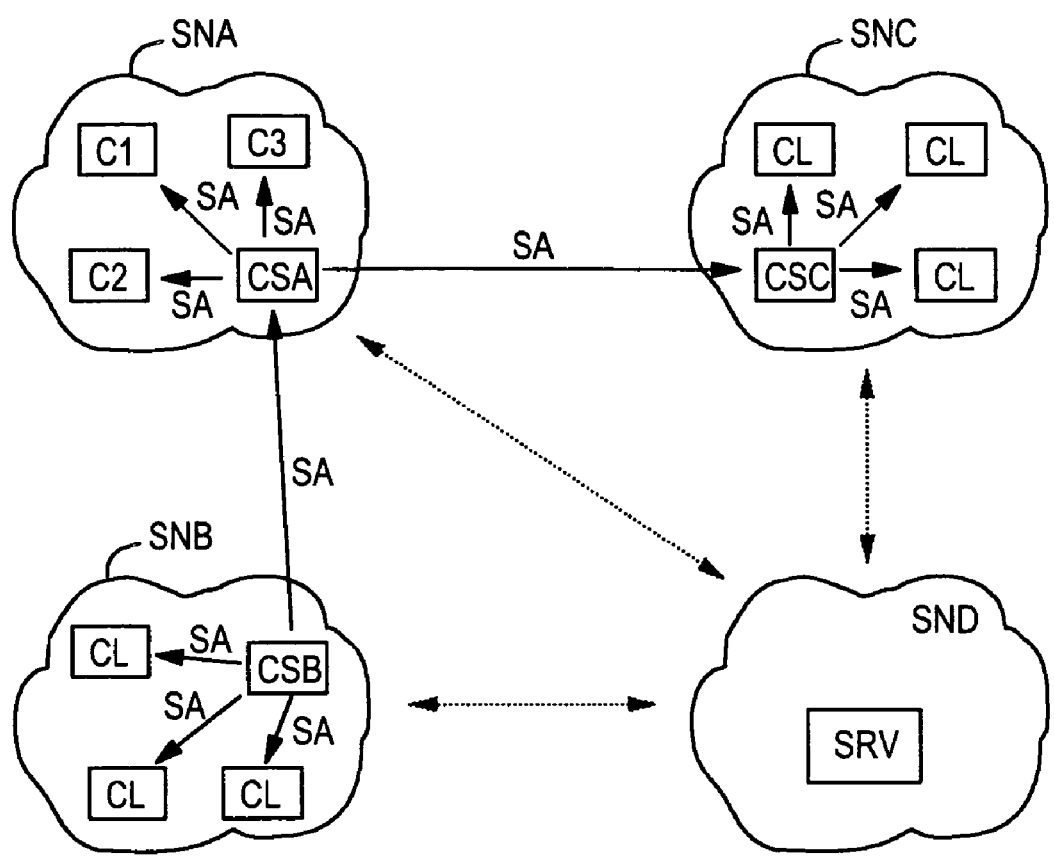

FIG. 5 shows an example of how the server IP address SA is transmitted by the selected client CSB by means of its output module OUT to the clients CL of its own subnetwork SNB and across the subnetworks to the selected client CSA, the IP address of which is known in the client CSB as a result of the previous query. The client CSA then transmits the server IP address SA to the clients C1, C2 and C3 of its own subnetwork SNA and across the subnetworks to the selected client CSC, which finally forwards the server IP address SA to the clients CL of its own subnetwork CNC. Transmission of the server IP address SA can be effected for example by means of what is known as a notify message.

In this way the IP address SA required for access to the server SRV is transmitted to all the clients CSA, CSB, CSC, C1, C2, C3 and CL of the network that require access to the server SRV. These clients CSA, . . . , CL are therefore assigned to the server SRV for the purposes of a client-server relationship.

The invention allows decentralized control of the largely self-organized assignment of clients distributed across a plurality of subnetworks to their server. Manual configuration or the setting up of central information services such as, for example, DNS (Domain Name System) or DHCP is therefore not necessary. If however such central information services as DNS or DHCP already exist in the network, they can advantageously be integrated very easily into the inventive concept. For example the selected clients can be set up so that they can also interrogate central DNS servers and/or DHCP servers as well as other selected clients for the IP address SA of the required server SRV. According to one variant of the embodiment, a DNS or DHCP server can be set up so that it behaves like a selected client as envisioned by the inventive method. Incorporating existing central information services such as DNS or DHCP means that the time required to search for the server and to distribute its IP address can be further reduced.

Implementation of the inventive method requires no modification of the server to be searched for, only modification of clients supporting the method. According to the present exemplary embodiment a client supporting the method has to be expanded by the addition of the selection module CSEL for selecting a client of its own subnetwork. A client supporting the method should also preferably be configured so that it supports an exchange of information with the selected client of its own subnetwork and so that it can forward queries by selected clients of other subnetworks to the selected client of its own subnetwork. In the case of a selectable client according to the present exemplary embodiment, a search module, in this instance SM, also has to be provided for searching across the subnetworks for selected clients, together with a memory, in this instance MEM, for storing the server IP address SA. Also to be provided in the case of a selectable client is an output module, in this instance OUT, for transmitting the stored server IP address SA to requesting selected clients outside its own subnetwork and to requesting clients of its own subnetwork.

The invention claimed is:

1. A method for assigning clients to a server, the clients distributed, across a plurality of subnetworks, each subnetwork having a plurality of clients, comprising:
for each subnetwork:
selecting only one of the clients in the respective subnetwork; and by at least one of the selected clients:
sending a query message to at least one other subnetwork in order to search for the server,
receiving a positive response message to the query, the positive response message having address information identifying the server,
storing the server address information,
transmitting the stored server address information to at least one nonselected client in the respective subnetwork, and storing an address of the client sending the positive response message when the received positive response message is from the selected client in one of the different subnetworks, wherein the server provides a service.

2. The method according to claim 1, wherein transmitting the stored server address information is initiated by a query originating from the at least one nonselected client.

3. The method according to claim 1, wherein the selected client of the respective subnetwork is determined from the clients within the respective subnetwork.

4. The method according to claim 1, further comprising:

by a nonselected client in the at least one other subnetwork:

receiving the query to search for the server, informing the selected client in the at least one other subnetwork of the query; and by the selected client in the at least one other subnetwork:

transmitting a response message to the selected client having transmitted the request, wherein when the item of server address information is known by the selected client in the at least one other subnetwork the response message is a positive response message and includes the item of server address information, and wherein when the item of server address information is unknown by the selected client in the at least one other subnetwork the response message is a negative response message.

5. The method according to claim 1, further comprising:

by the selected client in the at least one other subnetwork:

receiving the query message to search for the server, determining if the server address information identifying the server is stored within the respective selected client, and sending a response message to the selected client having sent the request, wherein when the address information is stored within the respective selected client the response message is a positive response message and includes the address information, and wherein when the address information is not stored within the respective selected client the response message is a negative response message.

6. The method according to claim 1, wherein the saving the server address information occurs when the address has not been previously stored.

7. The method according to claim 1, further comprising receiving a negative response message from the selected client in the at least one other subnetwork, the receive by the selected client having sent the query message.

8. The method according to claim 7, further comprising storing an address of the client sending the negative response by the selected client having sent the query message.

9. A client for connecting to a server, comprising:

a selection module for selecting a client from a plurality of clients of a subnetwork;

a search module for searching for selected clients in at least one other subnetwork and for searching for a server, the searching for selected clients for the server via a query message;

a memory having stored therein:

a first address information obtained in a positive response message responding to the query message, the first address identifying the server, the first address obtained when the positive response message is received from a located server or from a located selected client in at least one other subnetwork, and a second address obtained in the positive response message, the second address identifying a located selected client in at least one other subnetwork, the second address obtained when the positive response message is received from the located selected client; and an output module for transmitting stored server address information to at least one other client, wherein the server provides a service.

10. The client according to claim 9, wherein when the client is not the selected client for the respective subnetwork and the client receives a query message:

the output module transmits an information message to the selected client in the respective subnetwork, the information message informing the selected client in the respective subnetwork of a receipt of a query message.

11. The client according to claim 9, wherein the storing the server address information occurs when the address has not been previously stored.

12. The client according to claim 9, wherein the memory having a third address, the third address obtained when a negative response message is received from a selected client in the at least one other subnetwork.

* * * * *